Nov. 17, 1931.   H. J. WHITE   1,831,939
APPARATUS FOR TRAINING STUDENT PILOTS OF AIRCRAFT
Filed June 14, 1929
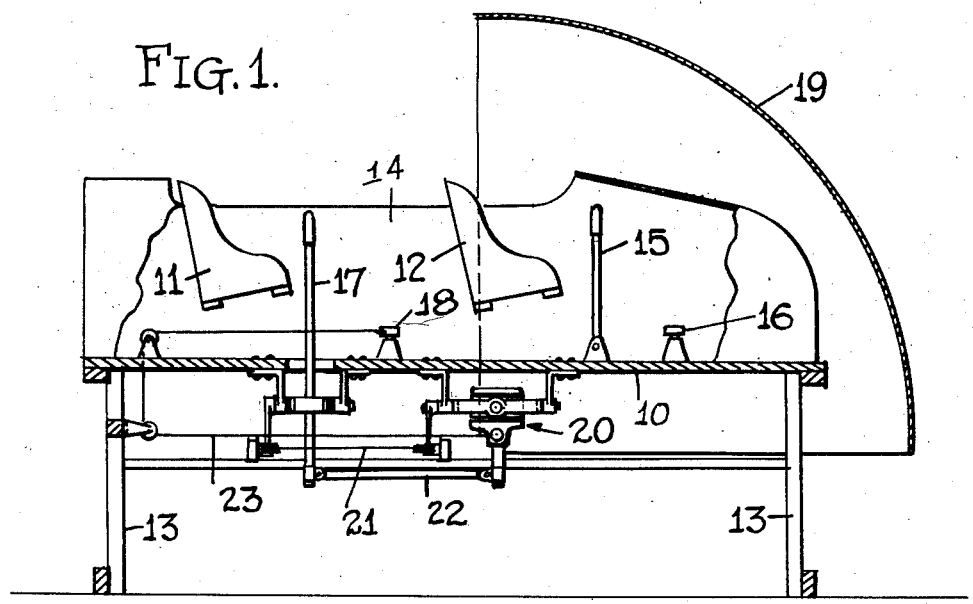
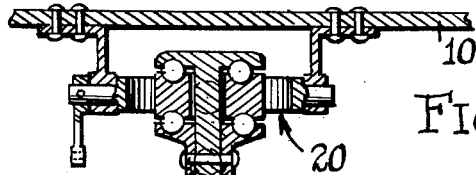
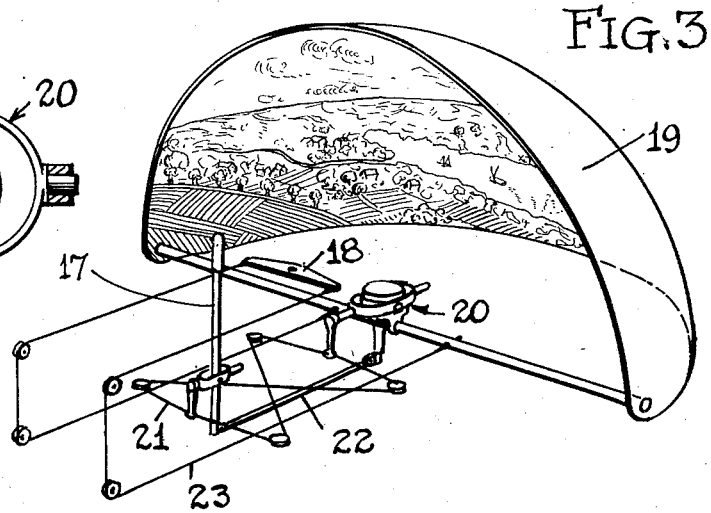
INVENTOR
HENRY J. WHITE.
BY
ATTORNEY Patented Nov. 17, 1931

1,831,939

UNITED STATES PATENT OFFICE

HENRY J. WHITE, OF NEW YORK, N. Y.

APPARATUS FOR TRAINING STUDENT PILOTS OF AIRCRAFT

Application filed June 14, 1929. Serial No. 370,943.

My invention relates to an apparatus or device for training and instructing pilots and observers of aircraft.

An object of the invention is to provide an apparatus of the above character which will enable the student to be satisfactorily and realistically given flying instruction without danger either to the student, to the instructor, or to the apparatus or machine.

A further object of the invention is to familiarize the student, during instruction, with such ordinary flight maneuvers as yawing, pitching and rolling, the effect, in each instance, being obtained thru the use of a shifting panorama controlled in its movements by the instructor.

A still further object of the invention is to so relatively position the student and instructor as to admit of the latter observing at all times the actions and reactions of the student in his effort to counteract or correct for the various movements of the shifting panorama or scene.

Other objects and advantages of the invention will be hereinafter set forth.

In the drawings, wherein like reference characters denote like or corresponding parts, Fig. 1 is a longitudinal vertical sectional view of the apparatus;

Fig. 2 is a detail view of the panorama operating means;

Fig. 3 is a perspective view, more or less diagrammatic, of the controls, and

Fig. 4 is a plan view of the universal mounting for the panorama partly in section and with parts broken away.

In the embodiment of the invention selected for illustration, 10 designates a platform upon which is mounted a seat 11 for the instructor and a seat 12 for the student, the latter seat, as indicated, being the forward of the two. Uprights 13 support said platform, as well as a body 14 within which the seats 11 and 12 are enclosed.

The seat 12 has adjacent to it "dummy" controls 15—16 similar to those used in an aeroplane, whereas the seat 11 has adjacent to it active controls similarly characterized. Said action controls include a control stick or lever 17 and a foot bar 18 both of which, thru appropriate connections, are fastened to a substantially hemispherical panorama or scene 19 mounted for movement in advance of the seat 12. On the inside face of said shiftable panorama there is preferably depicted a combination sky and ground scene having incorporated therein a horizon line (the scene and horizon line being omitted from Fig. 1). Preferably said horizon line extends transversely of the scene squarely in line with the straight ahead vision of the student. Accordingly, as the panorama shifts under the control of the instructor, it similates the apparent movement of the sky, ground and horizon around an aeroplane in flight. In other words, instead of shifting the apparatus or machine, and thus obtaining the impression of flight, the panorama is shifted about any one or all three of its axes to wit: vertical, longitudinal, and transverse.

To provide for the controlled movement of the panorama 19 about its several axes, a universal mounting 20 is provided. Said mounting (see Fig. 2) has attached thereto the control connections 21—22 leading off from the control stick 17 as well as the control connections 23 leading off from the foot bar 18. Thus connected, fore and aft movement of the control stick 18 imparts to the panorama, movement about its transverse axis; sidewise movement of the stick imparts to the panorama movement about its longitudinal or fore and aft axis, and back and forth, or rotational movement of the foot bar 18, imparts to the panorama movement about its vertical axis, i.e., movements corresponding to and actually simulating (the imparted, not to the machine, but to the panorama) the movements encountered in flying.

In training student pilots the apparatus described is used substantially as follows: The student is seated in the seat 12. The instructor is seated in the seat 11. The student is so positioned that he may, without difficulty, observe the panorama 19 but may not observe the position of the controls of the instructor and preferably is unable to see any objects outside of the apparatus. The instructor by the stick 17 and the rudder bar 18 is able to rotate the panorama 19 about any one of three perpendicular axes. The student thus gets the same impression that he would in an airplane while in flight. That is, he feels that the airplane is stationary and that the world, represented by the panorama, is moving about the airplane. The student then operates his stick 15 and rudder bar 16 as he would in an airplane in flight to correct the attitude of the airplane. This movement of the stick 15 and the rudder bar 16 does not have any effect upon the panorama 19, inasmuch as the panorama is controlled entirely by the instructor by the movement of the stick 17 and the rudder bar 18. However, the instructor is able to observe the exact position of the student's stick 15 and rudder bar 16 and the reactions of the student in response to movements of the panorama and is thus able to tell whether the student is acting correctly in the supposed situations. The instructor may simulate through movement of the panorama either a quick response to the movements of the student's controls or a slow response thereto or may even simulate such conditions as a spin in some airplanes in which there is no response to movement of the controls. He may simulate gusts in which the airplane continues to move further from its level position in spite of movement of the controls. It may be observed that the controls of the instructor as shown in Figs. 1 and 3 are so connected to the panorama 19 that movement of said controls moves the panorama in a direction opposite to that in which the world would appear to move according to the usual result of like movements of the controls of a full sized airplane. Therefore, in order for the student to move his controls in a direction corresponding to that which he should in order to right the airplane under similar circumstances, he must move his controls in the same direction as the instructor. Thus, the instructor, knowing the position of his own controls can watch the controls of the student and easily discover any faults in piloting, it being unnecessary for him to observe the panorama. The control cables leading from the instructor's controls may be so arranged, however, if desired, that movement thereof will affect the panorama 19 in a way similar to that in which it would usually be affected in a full sized airplane. Thereupon, the instructor, knowing the position of his own controls, would watch the controls of the student to see that they are moved to a position opposite to his own controls.

The advantages of an apparatus thus characterized are as follows: (1) The student is under the direct observation of the instructor at all times. (2) The instructor may shift the panorama or scene at will, and continue so to do until the pilot instinctively reacts instantaneously and properly under all operating conditions, (3) Ground instruction can be prolonged until such time as it is apparent that the student has mastered the fundamentals of aeroplane control, (4) The use of expensive machines for preliminary training is eliminated, (5) Accidents due to improper control movements on the part of the student during such preliminary training work cannot occur, and (6) A greater number of students, with less flying equipment may be properly trained in a shorter period of time.

If desired, instead of a large panorama such as that indicated in the drawing, a miniature panorama may be substituted. Where such miniature panorama is used, a magnifying lens may be provided, and the miniature panorama mounted in such relation to such lens as to magnify the scene depicted on the panorama. Except for such difference in size, and for the intervention of the lens, the arrangement is as previously described.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an apparatus of the character described, the combination, of a seat for a student pilot, a shiftable member mounted in advance of said seat and having portrayed on a surface thereof a representation of a view such as might be seen from an aerial vehicle in flight, dummy aircraft controls adjacent to said seat, and means for controlling the movements of said member.

2. In an apparatus of the character described, the combination, of a seat for a student pilot, aircraft controls adjacent to said seat, a shiftable hemispherical member mounted directly in advance of the line of vision of said pilot while seated in said seat and having portrayed on a surface thereof a representation of a view such as might be seen from an aerial vehicle in flight, and means for controlling the movements of said member.

3. In an apparatus of the character described, the combination, of a seat for a student pilot, a member movable in rectangularly opposed planes directly in the line of vision of said pilot while seated in said seat and having portrayed on a surface thereof a representation of a view such as might be seen from an aerial vehicle in flight, and means for controlling the movements of said member.

4. In an apparatus of the character described, the combination, of a seat for a student pilot, a member having a universal mounting positioned in advance of the line of vision of said pilot while seated in said seat and having portrayed on a surface thereof a representation of a view such as might be seen from an aerial vehicle in flight, and means for controlling the movements of said member.

5. In an apparatus of the character described, the combination, of a seat for a student pilot, a seat for an instructor mounted behind said first mentioned seat, a member shiftable about a plurality of axes in the line of vision of said pilot while seated in said seat and having portrayed on a surface thereof a representation of a view such as might be seen from an aerial vehicle in flight, and means under the control of the instructor for shifting said member about said axes at will.

6. In an apparatus of the character described, the combination, of a seat for a student pilot, a movable member mounted in advance of said seat to extend transversely across the line of vision of said pilot and having portrayed on a surface thereof a representation of a view such as might be seen from an aerial vehicle in flight, and means for shifting said member in any one of three or more directions as and for the purpose specified.

7. In apparatus for teaching aircraft piloting, the combination, of a stationary seat, a member movable in rectangularly opposed planes and having portrayed on a surface thereof a representation of a view such as might be seen from an aerial vehicle in flight, a stick pivoted about two axes for moving said member in two of said planes respectively and a foot operated device for moving said member in a third plane.

8. In apparatus for teaching aircaft piloting; the combination of a seat; a member movable about a plurality of axes, mounted in advance of said seat and having portrayed on a surface thereof a representation of a view such as might be seen from an aerial vehicle in flight; a stick pivotally mounted adjacent to said seat on a longitudinal axis extending forwardly from said seat toward said member; and means for connecting said stick to said member and causing the rotation of the member about a longitudinal axis in response to movements of the stick about its axis.

9. In apparatus for teaching aircraft piloting, the combination, of a frame work, a seat supported by said frame work adjacent to one end thereof and positioned so that the occupant thereof faces the opposite end of the frame work, a member mounted within the range of vision of said occupant and at the opposite end of said frame work for pivotal movement about an axis extending transversely of the frame work and having portrayed on a surface thereof a representation of a view such as might be seen from an aerial vehicle in flight, a stick similar to the stick control of an airplane pivotally mounted on a transverse axis adjacent to said seat, and means for connecting said stick and said member and for causing movement of the member about its transverse axis in response to movement of the stick about its transverse axis.

10. In apparatus for teaching aircraft piloting, the combination, of a frame work, a seat mounted on one end of said frame work in such a position that the occupant of the seat faces the opposite end of the frame, a member pivotally mounted on a vertical axis adjacent to the opposite end of the frame work and within the range of vision of said occupant and having portrayed on a surface thereof a representation of a view such as might be seen from an aerial vehicle in flight, a foot control mechanism mounted on a vertical axis adjacent to said seat, and means for connecting said mechanism with said member and for causing movement of said member about its vertical axis in response to movement of the mechanism about its vertical axis.

11. In apparatus which may be used by an instructor for teaching aircraft piloting to a student pilot, the combination, of a seat for said student pilot, a member having portrayed upon a surface thereof a representation of a view such as might be seen from an aerial vehicle in flight of sky and ground, means under the control of said instructor for causing relative movement between the seat and the scene, and dummy aircraft controls arranged adjacent to said seat.

In testimony whereof I hereunto affix my signature.

HENRY J. WHITE.